(No Model.) 4 Sheets—Sheet 1.
C. A. L. TOTTEN.
LINEAR OR OTHER SCALE.
No. 331,345. Patented Dec. 1, 1885.
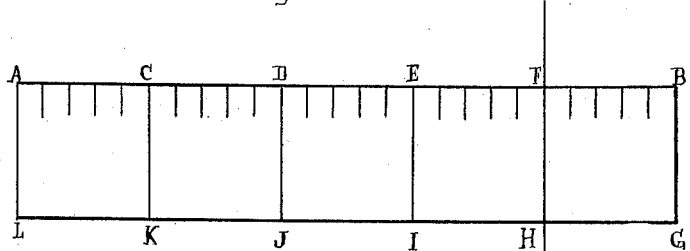
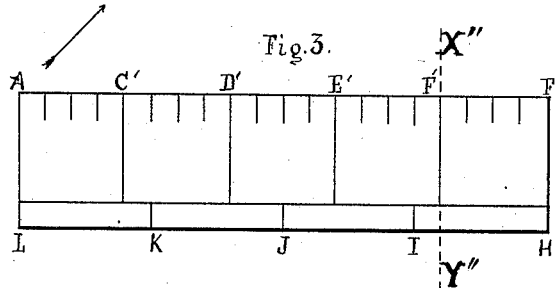
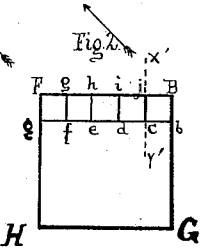
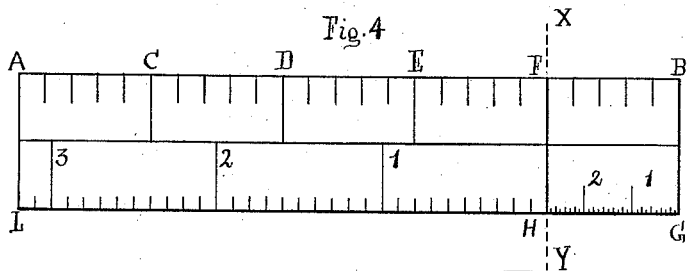
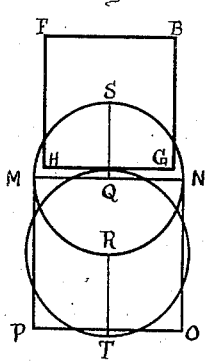
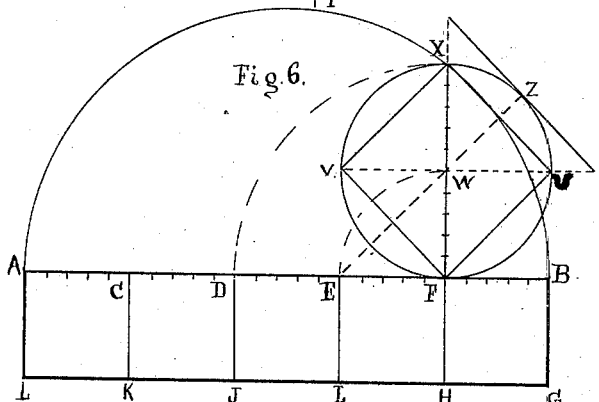
WITNESSES:
John R. Totten
Jacob M. Clark
INVENTOR
C. A. L. Totten (No Model.)  4 Sheets—Sheet 2.

C. A. L. TOTTEN.
LINEAR OR OTHER SCALE.

No. 331,345. Patented Dec. 1, 1885.

WITNESSES:

INVENTOR

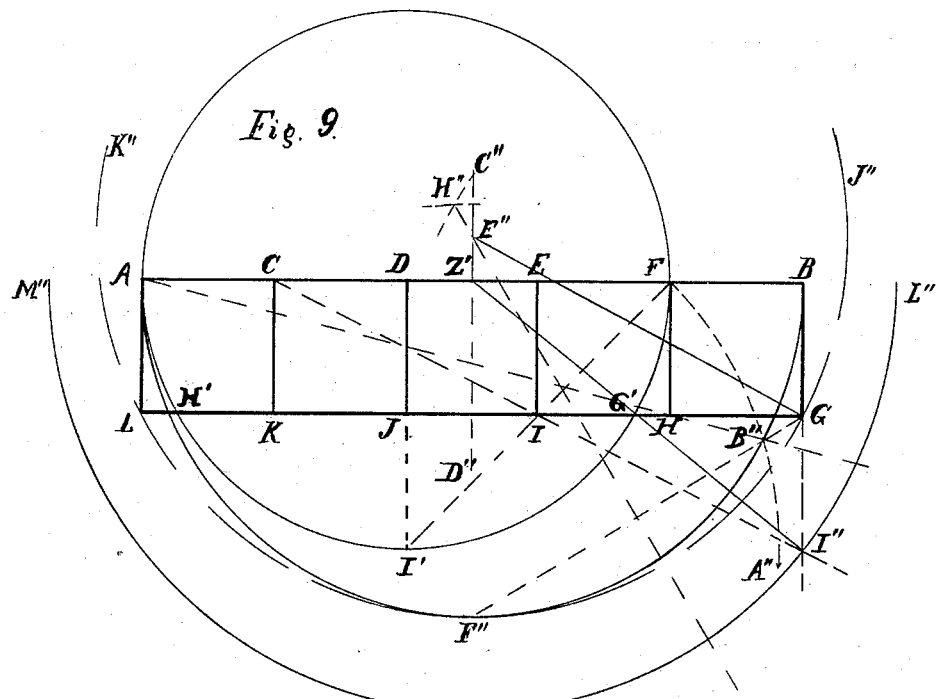
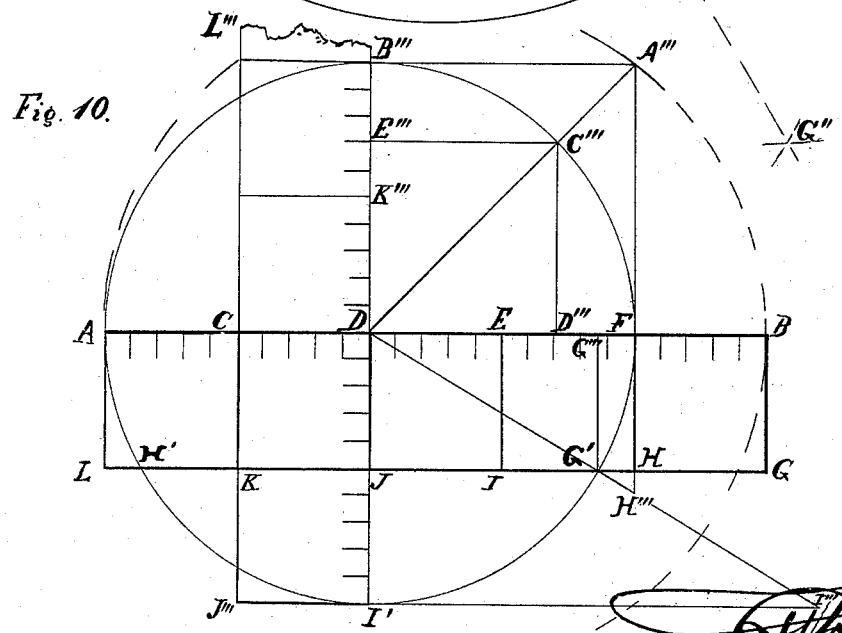

(No Model.) 4 Sheets—Sheet 4.
C. A. L. TOTTEN.
LINEAR OR OTHER SCALE.
No. 331,345. Patented Dec. 1, 1885.
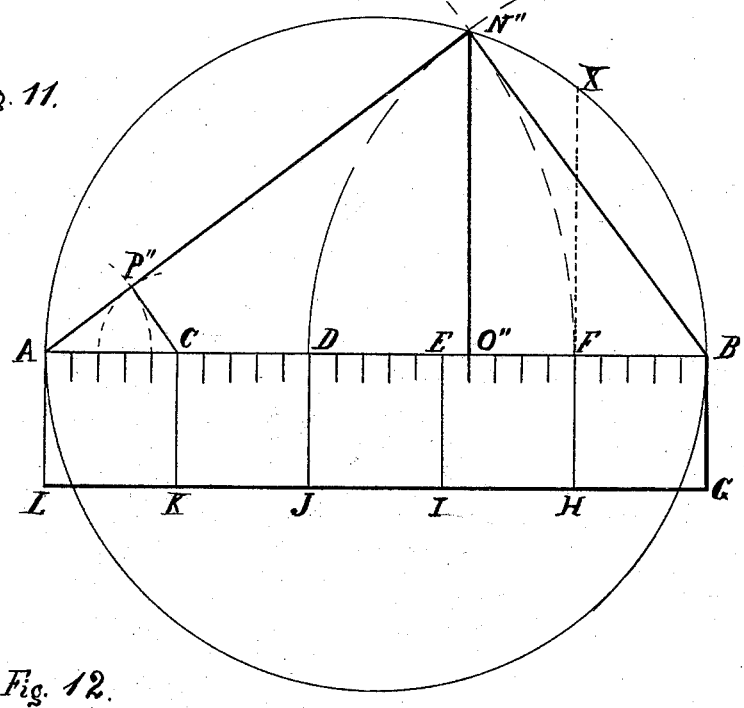
Fig. 11.
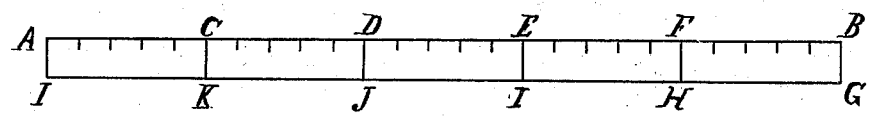
Fig. 12.
Fig. 13.
|←- - - - 24-Inch - - - - - - Rule - - - - - - - - →z'|
|←- - - - - - R = 3.18+ - - - - - - - - - - *R'= 2.82+ - -→|
Rest of Scale to be Gradua-ted to suit convenience
Also Reverse Side if desired.
|←- - - - - - - - 25-In - - - - - - - - - →|
WITNESSES:
John R. Totten.
Jacob M. Clark
C. A. L. Totten
INVENTOR.
N. PETERS, Photo-Lithographer, Washington, D. C.

UNITED STATES PATENT OFFICE.

CHARLES A. L. TOTTEN, OF GARDEN CITY, NEW YORK.

LINEAR OR OTHER SCALE.

SPECIFICATION forming part of Letters Patent No. 331,345, dated December 1, 1885.

Application filed February 1, 1884. Serial No. 119,514. (No model.)

*To all whom it may concern:*

Be it known that I, CHARLES A. L. TOTTEN, (United States Army,) a citizen of the United States, residing at Garden City, Queens county, New York, have invented new and useful Improvements in Constructing and Proportioning Linear and other Scales; and I do hereby declare that the following is a full, clear, and exact description of the invention, which will enable others skilled in the art to which it appertains to make and use the same.

My invention relates to the particular subdivision of any linear or other scale into certain "primary" parts and "units," which I have discovered to be of special and hitherto unknown value to the practical draftsman and mathematician, and the application of such scales to the solution of the various problems in geometry, ordinary graphics, trigonometry, &c.

To introduce the explanation of my discovery at once, let AB, Figure 1, represent any linear scale or "standard length," whatsoever—as, for instance, a foot, an ell, a yard, a meter, &c. Now, without reference to the absolute length of this scale, I shall subdivide it into five (5) equal parts, which I shall term "primaries," as AC, CD, DE, EF, and FB, and shall or shall not, as the case may be, subdivide each of these several primaries into five (5) other parts, which I will term the "units" of my subdivision. Any standard scale or length which I shall thus treat will be thereby subdivided into twenty-five (25) units and five (5) primary parts, which may or may not have a direct reference to the original and ordinary parts into which the standard length so treated is usually divided. I know of no scale or standard now in use among men the whole length of which is thus divided into fifths and twenty-fifths; nor has there hitherto been any demand for such a system of subdivision, because I believe myself to have been the original and only discoverer of a most powerful sequence of properties thence resulting. I discovered these properties several years ago, and since then have vainly endeavored to find scales so made as to conform to the uses I have discovered, and to the present time (being unable to find that any one has made them or known of their value) I have been forced to construct my own. In this application I now make these properties, and the scale-subdivision requisite to accomplish them, known to the public for the first time.

To better elucidate the properties which I have discovered, and so to establish their originality and the value of my subdivision, I will here introduce an additional feature, which belongs to my more general scale and subdivision—to wit, that the width BG of the scale, Fig. 1, shall also be equal to a primary subdivision of the whole or to one-fifth the whole standard AB. It is now manifest that the part FBGH cut off of the right hand of the scale by the line XY is a perfect square, or, in other words, that the whole standard consists of five such equal squares, each equal to a square primary. Let us now examine some of the properties of this scale and its practical applications.

Since FB is the side of the primary square, and since the whole perimeter of this square is equal to 4 FB, or equal to AF, and since the area of such primary is equal to twenty-five square units, it follows that the number of units (five) to the right of the line XY expresses the length of the side of the square, the number (twenty) to its left the units in its perimeter, and the whole number in the scale (twenty-five) the area of the square. This remarkable result of such a subdivision of any length whatsoever (no matter what may be its original or ordinary units and subdivisions) is still more noticeable when we reflect that each of the segments FB = 5 and AF = 20 may be similar subdivided into fifths, and possess a part of the properties belonging to the whole. Thus (Fig. 2) the length FB = 5 × 1 units has its division into fifths, each of which is an integral unit. Draw $fb$ parallel to FB at a unit's distance, then will $jBbc$ be a unit-square whose side is $jB=1$, whose perimeter is $jBbc=4=Fj$, and whose area unity is one-fifth, (*i. e.*, of the small scale FB$bg$,) or the twenty-fifth of the whole primary FBGH. So, too, the part AF of the original scale, Fig. 1, being equal to twenty, or to 5×4, may likewise (Fig. 3) be subdivided, without destroying the integrity of any of its units, into five parts of four units each by the lines at C', D', E', and F', and of such latter subdivision F'F is the side = 4. AF' is equal to the perimeter 16, and also to the area of the new primary F'F². Thus, manifestly, any scale whatever may be subdivided into fifths, called "primaries," and into twenty-fifths, called "units," and the two segments of the whole (such as would be made by the perpendicular line XY at one of its terminal fifth-part divisions) be similarly so resubdivided without rupturing the units so established. Now, by means of the value of $\pi = 3.1415926535$, &c., it is manifest that a circle may be calculated whose area shall be equal to twenty-five square units, the radius (QS, Fig. 5) of such circle will be 2.8209+ units in length. Let it be assumed that this radius corresponds to the side of the equal square; hence it is manifest that if the side GH, Fig. 4, be divided into 2.8209+ parts, still considered as units, while the side BF retains its regular subdivision into fifths, we shall have a new scale, HG, Fig. 4, wherewith to measure sides of squares in order to obtain the lengths of radii to corresponding circular areas. In a similar manner the radius of that circle whose circumference is equal to twenty units, or the perimeter of the square is 3.180+ units, and a scale of this number of subdivisions cut upon the length LH, Fig. 4, will enable us similarly to measure perimeters of squares and directly obtain the number of units in the radius of a corresponding circumference. It is also clear that if a primary length, as LK, equal to a side of the square primary be subdivided into 3.180+ parts it will afford a scale for measuring sides of squares, instead of their perimeters, for the purpose of obtaining a number of units in a radius of equal perimeter.

Fig. 5 shows the relations of these several connected squares and circles and the proportional lengths of their sides and radii. In it FBGH is the primary of one subdivision; MNSR, the circle of equal area; QS, the radius =2.82+, corresponding to FB=5, the side of the square; MN = the side of that particular square whose area is equal to that of a circle whose circumference is equal to the perimeter of the primary. RT is the radius of this equal circumference =3.180+, &c., units.

To continue our examination of this remarkable subdivision, let (Fig. 6) ABGL be a scale subdivided into fifths and twenty-fifths. Upon AB as a diameter describe the semi-circumference AXB. At F erect the perpendicular FX, limited by its intersection with the semi-circumference. Then will FX be equal to ten units in length, because it is a mean proportional between the segments AF=20 and FB=5. On XF as a diameter describe a circle XZUFV. It will be that particular one all of whose functions are units, since it is the one whose diameter is ten, or the root of the decimal system. Hence XU—the side of an inscribed square, or the corresponding side of the circumscribed square, (tangent at Z,) are in effect as much functions of my scale (through its twenty-five-unit subdivision) as are the units of that scale itself; and the side of a square inscribed or circumscribed in a circle of any diameter whatever can be obtained directly by multiplying the length XU, &c, by the length of the new diameter. In fact, all the functions of the circle XUFV may be determined directly from the scale without resort to any table of constants, as is the usual practice; and a scale so constructed must have marked advantages for the practical workman. Again, upon this particular subdivision all geometry may be shown to be founded. I will illustrate by referring to the direct construction of any of the regular polygons by its use, and before commencing will state that no other subdivision whatever possesses similar properties.

There are two classes of regular polygons, rational and irrational. The former can be constructed accurately by geometrical processes; the latter cannot. The former comprise the equilateral, the square, the pentagon, the hexagon, the octagon, the decagon, the dodecagon, the fifteen-sided and the sixteen-sided polygons and their derivatives. The latter comprise the heptagon, the nonagon, the eleven, thirteen, and fourteen sided polygons and their derivatives. Both of these classes can be constructed in the most simple manner by a draftsman pursuing a scale as I subdivide it, the former accurately, the latter in a most remarkable approximation true to the third place of decimals.

Fig. 7 shows the manner of obtaining the several rational polygons directly from my scale. To illustrate, (Fig. 7,) let the scale ABGL be subdivided as before, with D as a center, and DA=10 units as a radius describe the circle AK'N'I'F. This is as important a circle as the one whose diameter is ten, and all of its functions are likewise radical ones in decimal terms. Now, I will merely state the facts without lengthy demonstration, (and many of my results are self-evident.) The portion of the base of the scale H'G' cut off by the circle gives the side of an inscribed equilateral; AK (a diagonal of the primary ACKL) produced to its intersection with the circle at I' gives us AI', the side of the inscribed square. With the diagonal JA of the two primaries ADJL describe the arc AJ'. Draw the chord J'A. It is the chord of a fifth or the side of the pentagon. The radius AD, equal to two primaries, is the side of the hexagon. Produce the diagonal DK to K', and the subdivision DJ to I'. Join I'K'. It will be the side of the octagon. J'D is the side of the decagon, H'A that of the dodecagon. Draw LB the full diagonal of the scale, intersecting the circle at L'. Then will L'G' be the chord of the fifteenth—i. e., the side of a fifteen-sided polygon. From K' draw K'F, intersecting the base of the scale at M'. Through M' draw DM produced to N'. Then will I'N' be the side of the sixteen-sided polygon. Simple bisections of these chords will carry the process onward indefinitely through every possible rational polygon.

The irrational polygons result as simply, ble properties we have just made clear, but will thus be joined directly onto the Anglo-Saxon system of linear measure in a most intelligent manner. It will be convenient in length, (but one inch longer than our common two-foot rule,) and, as a quarter of one hundred inches, possesses valuable decimal features. Of such a standard the decimal foot of ten inches (see XF, Fig. 11) and the common foot of twelve inches (see N″O″, Fig. 11) will be direct functions. So, too, will be the yard, which is three times N″O″, &c.

Now, such a standard length as a "measure," so called, is unknown to the mathematician and to the instrument-maker. The former has not perceived its power, and hence, there having been no demand for it, the latter has not made it. I have searched for it in vain in the catalogues, and have asked for it fruitlessly at the shops of such makers and dealers as Darling, Brown & Sharpe, of Providence; Kenffel & Essen, and A. V. Benoit, &c., of New York; Queen & Co., of Philadelphia, &c. Being thus unknown to Anglo-Saxon makers and dealers and importers, who alone employ the inch as a unit, it is even more unknown upon the continent, where the metric system pervades. It is thus certainly as new a discovery in every respect as are the mathematical constructions which thence result.

Fig. 12 shows a scale of any length and width divided according to my system into fifths and twenty-fifths.

Fig. 13 shows a twenty-five inches scale or standard divided into fifths and twenty-fifths, and having likewise upon it the twenty-four inch rule, the scales of radii corresponding to squares of equal area and perimeter, and upon which on the unoccupied obverse and reverse parts any other scales and subdivisions now in use may be put.

Figure 7:
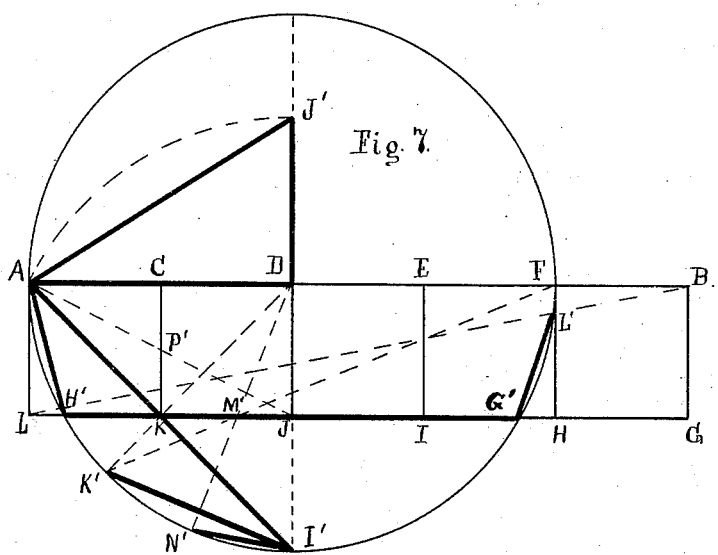
Figure 8:
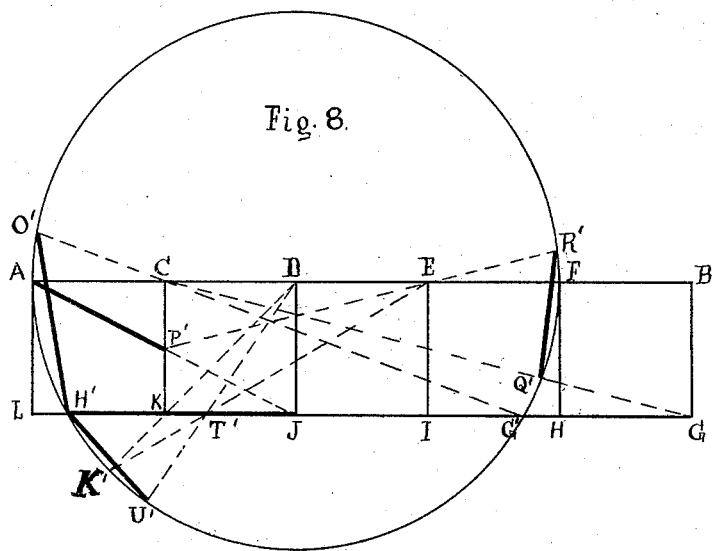

I am not particular, nor is it essential to my discovery to claim any particular arrangement of these scales and subdivisions. I intend to combine them differently upon different standards and according to circumstances. I intend also to engrave, for special and standard purposes, such a scale as I have described upon "surface-plates," &c., so as to show more or less of all the more important construction-lines, units, primaries, functions, &c. Nor do I limit myself to subdividing any particular length into fifths and twenty-fifths. I intend to treat all standard and other lengths in this manner, no matter what they may be in terms of any other unit either as to length or breadth.

Having thus described my invention, what I desire to claim and secure by Letters Patent is—

1. A scale for linear measure the entire length of which is divided into five equal parts, each of such parts being also divided into five equal parts, as and for the purpose described.

2. A scale for draftsman's use, divided, as set forth, throughout its entire length, into fifths and twenty-fifths, and whose width is one-fifth of the length, substantially as described.

3. A linear scale for draftsman's use, bearing lines adapted to lay off the sides of rational and irrational polygons, and divided to indicate the radii of circles corresponding to squares of given dimensions, and vice versa.

In testimony whereof I have hereunto set my hand and seal in the presence of two subscribing witnesses.

C. A. L. TOTTEN. [L. S.]

Witnesses:
  JOHN R. TOTTEN,
  SILAS R. WHITNEY.